United States Patent Office 3,503,421
Patented Mar. 31, 1970

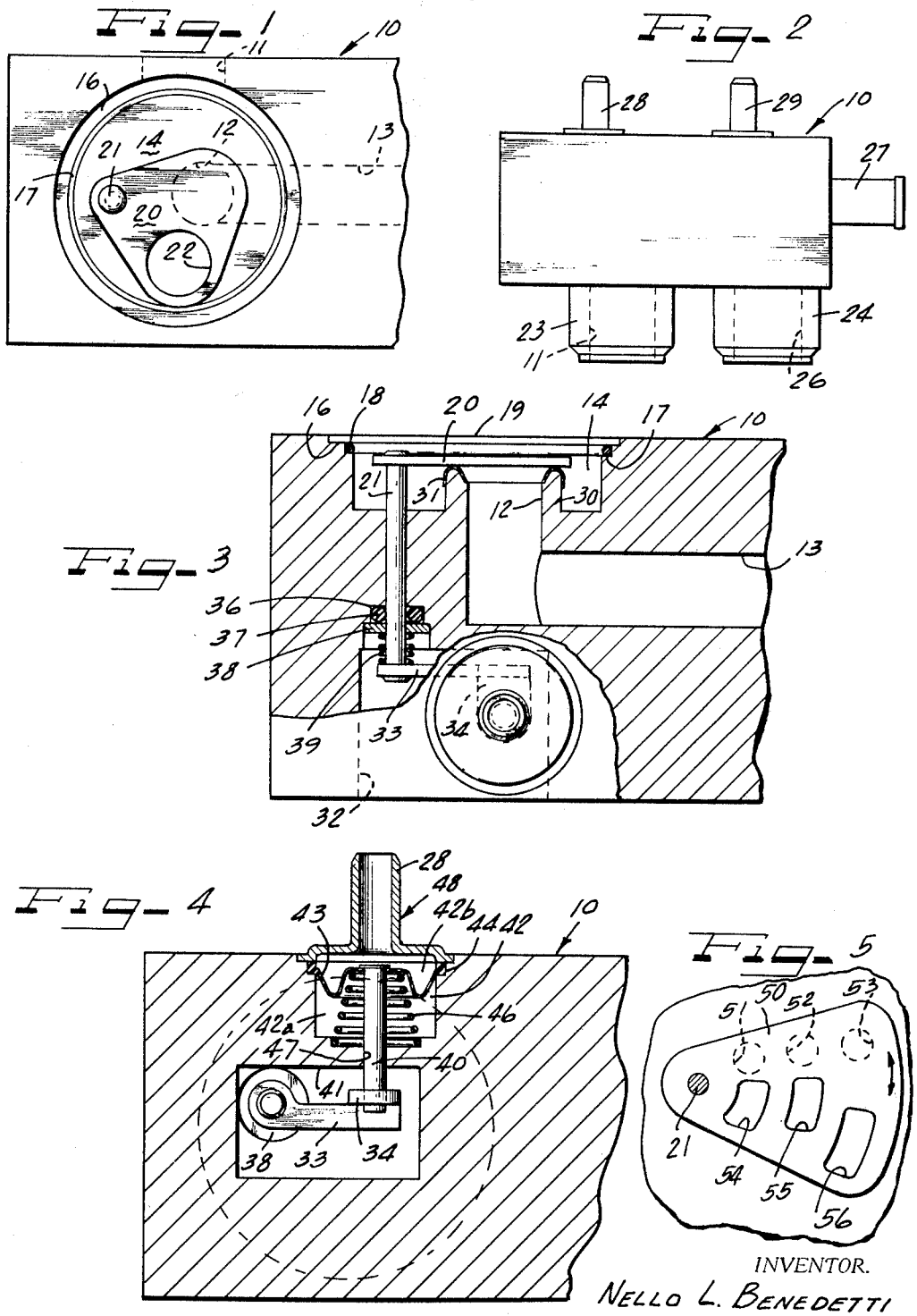

3,503,421
PNEUMATIC OR VACUUM OPERATED MIXING VALVE
Nello L. Benedetti, Mount Prospect, Ill., assignor to Eaton Yale & Towne Inc., a corporation of Ohio
Filed May 22, 1967, Ser. No. 639,949
Int. Cl. F17d; F16k 11/00, 31/12
U.S. Cl. 137—625.4                         3 Claims

ABSTRACT OF THE DISCLOSURE

A pneumatically operated mixing valve for controlling the flow of different temperature fluids through the valve, as for example, hot and cold water, to obtain at the outlet port of the valve either cold water, hot water, or an intermediate temperature water derived by mixing of the hot and cold water within the valve housing. A rotatable apertured plate is positioned within the fluid chamber of the valve and overlies a port therein to control the flow of fluid through the chamber. The plate is secured to a rotatable shaft which extends through the housing and which has one end thereof connected to a pneumatic actuator. The pneumatic actuator rotates the shaft thereby placing the aperture in the plate in and out of registry with the port assocated therewith. A groove is formed in the housing and about the shaft and an O-ring is held in position in the groove so as to embrace the shaft thereby providing a fluid tight seal between the shaft and the chamber.

BACKGROUND OF THE INVENTION

Field of the invention

This invention relates generally to mixing valves of the type used to mix hot and cold water together to provide at the outlet of the valve a flow of water having an intermediate temperature, and more particularly to a pneumatically operated mixing valve. Specifically, the present invention is directed to a mixing valve which utilizes a rotatable plate which slides over a port to control the flow of fluid through the port.

Description of the prior art

Heretofore, pneumatically operated mixing valves incorporated a push rod type control element which actuated a valve head so that the valve head would control the flow of fluid through an associated port. However, the push rod like action, reciprocating action, caused excessive wear of the seal surrounding the push rod. Therefore, valves constructed in this manner are relatively short lived.

SUMMARY OF THE INVENTION

Therefore, it is an object of the present invention to provide a pneumatically operated mixing valve which controls the flow of fluid through the valve by the use of a rotatable shaft rather than an axially movable shaft.

Another object of the present invention is to provide a pneumatically operated mixing valve wherein the pneumatic actuators are contained within the valve housing.

Yet another object of the present invention is to provide a pneumatically operated mixing valve wherein an O-ring is effectively utilized to provide a fluid tight seal between a rotatable shaft and a fluid receiving chamber, Briefly, the pneumatically operated mixing valve of the present invention includes a housing having cold and hot water inlets and a single outlet. A pair of chambers are formed within the housing, one chamber being in fluid communication with, for example, the cold water inlet and with an outlet passage formed within the housing, and the other chamber being in fluid communication with the hot water inlet and the outlet passage in the housing. A rotatable shaft extends through the housing and terminates in the cold water chamber, while another rotatable shaft extends into the housing and terminates in the hot water chamber. A groove is formed in the housing about each of the shafts to receive an O-ring to provide a water tight seal between the shaft and its respective chamber. Connected to each of the shafts, within their corresponding chambers, is an apertured plate which extends radially from the shaft and overlies a port to control the flow of fluid through the port. The pneumatic actuator is mounted within a cavity formed in the housing and includes an actuator arm and a link connected to the rotatable shaft to convert the straight line motion of the pneumatic actuator to rotary motion of the shaft. The unique advantage obtained by the novel construction of the mixing valve of the present invention is that the O-ring seal provided around the rotatable shaft is more effective as would otherwise be realized by a reciprocating shaft.

BRIEF DESCRIPTION OF THE DRAWINGS

Other objects, features and advantages will be more fully realized and understood from the following detailed description when taken in conjunction with the accompanying drawings in which like reference numerals throughout the various views of the drawings are intended to designate similar elements or components and wherein:

FIGURE 1 is a plan view of a portion of the mixing valve of the present invention and shows the rotatable plate for controlling the flow of fluid through its associated chamber;

FIGURE 2 is an elevational view showing the overall construction of a pneumatically operated mixing valve of the present invention;

FIGURE 3 is an elevational sectional view showing the detailed construction of the rotatable shaft and plate connected thereto and a pneumatic actuator positioned within the housing of the valve;

FIGURE 4 is another elevational sectional view showing the detailed construction of the pneumatic actuator within the housing of the valve; and FIGURE 5 is an alternate arrangement of a rotatable plate associated with a plurality of ports to control the flow of fluid through a mixing valve.

DESCRIPTION OF THE PREFERRED EMBODIMENTS

Seen in FIGURE 1 is a portion of a pneumatic operated mixing valve constructed in accordance with the principles of this invention. The mixing valve includes a housing 10 which has an inlet port 11 and an outlet port 12 formed therein. The outlet port 12 is in fluid communication with an outlet passage 13 which passes through the housing.

A chamber 14, preferably of cylindrical shape, is formed in the housing 10. The periphery of the chamber 14, at or near the outer surface of the housing is provided with a first recessed portion 16 radially outwardly of the chamber, and a second recessed portion 17 radially outwardly of the chamber 14 but radially inwardly of the first recessed portion 16 and recessed therefrom. As best seen in FIGURE 3, an annular seal 18 is positioned in the second recessed portion and is held in place by a cover 19. The cover 19 fits snugly in the first recessed portion 16 and forms one wall of the chamber 14.

Again referring to FIGURE 1, a plate 20 is secured to a rotatable shaft 21. An aperture 22 is formed in the plate 20 and extends radially from the shaft 21 a distance equal to the distance of the port 12 from the shaft 21. Therefore, rotation of the shaft 21 will rotate the plate 20 and place the aperture 22 in registry with the port 12 thereby allowing fluid to flow through the port and into the outlet passage 13.

Shown in FIGURE 2, the overall configuration of the pneumatic mixing valve includes a pipe or hose connector 23 which forms a portion of the inlet port 11. Also, a second connector 24 is formed on the housing 10 and defines a second inlet port 26. By way of example, and not by way of limitation, the connector 23 may be connected to a supply of cold water, while the connector 24 may be connected to a supply of hot water. A second chamber and rotatable plate are provided within the housing and are of the same configuration as the chamber and plate shown in FIGURE 1. Accordingly, a detailed description of only one of the chambers, and its associated components, will be given.

Also connected to or formed on the housing 10 is an outlet connector 27 which may pass either cold, hot, or an intermediate temperatured fluid, depending upon the condition of the rotatable plates in the valve body. A pair of hose connectors 28 and 29 are secured to the housing 10 and in fluid communication with a pneumatic actuator which is formed within a cavity in the housing. The hose connectors 28 and 29 may be connected to either a positive source of pressure or a negative source of pressure depending upon the arrangement of the pneumatic actuator within the housing. Therefore, the term pressure source throughout the specification and claims is intended to define either a positive source of pressure or a negative source of pressure.

Again referring to FIGURE 3, a raised boss 30 is formed within the chamber 14. The uppermost portion of the boss 30 is preferably rounded as shown, and has secured thereto a resilient member 31 which engages the undersurface of the plate 20. The resilient member 31, together with the undersurface of the plate 20, form a fluid tight seal about the outlet port 12 when the plate 20 is in the position shown in FIGURE 1. However, rotating the plate 20 about the rotatable shaft 21 will place the aperture 22 in registry with the outlet port 12 thereby allowing fluid to flow from the chamber 14 into the outlet passage 13.

The shaft 21 extends through the housing 10 and has one end thereof terminating within a cavity 32 formed in the housing 10. The cavity 32 may be considered the outer portion of the housing as the cavity is at atmospheric pressure and may or may not include a cover plate. The end of the shaft 21 extending into the cavity 32 is secured to a lever 33 which extends radially therefrom. A finger 34 is secured to the lever 33 and extends therefrom so as to engage an actuating pin of a pneumatic actuator. Therefore, it can be readily seen that movement of the lever 33 will cause the shaft 21 to rotate.

A groove 36 is formed in the housing about the shaft 21 and contains an O-ring 37 which forms a seal about the shaft 21. The groove 36, as shown on the drawing, is formed by an annular recess machined in the housing and covered by a retainer plate 38. However, it will be understood that the retainer plate may be eliminated or other means provided to form the groove 36.

One unique advantage obtained by constructing a pneumatic operating mixing valve in this manner is that a simple and inexpensive part such as an O-ring is effectively utilized to provide a fluid tight seal between the shaft 21 and the chamber 14. As the shaft is only rotated and not reciprocated to control the flow of fluid through the valve, the O-ring 37 has a longer life expectancy than an O-ring which is used to provide a fluid tight seal between a reciprocating shaft and a chamber.

The plate 20 is biased toward the boss 30 by the use of a spring 39 which is positioned between the retainer plate 38 and the lever 30 and about the shaft 21. Therefore, the spring 39 maintains the undersurface of the plate 20 in firm abutting relation to the resilient member 31. Also, the spring 39 serves a dual purpose in that the spring maintains the retainer plate 30 in position thereby confining the O-ring 37. Therefore, the construction of a pneumatic operated mixing valve of the present invention not only utilizes an O-ring at its maximum efficiency but also simplifies the construction of the valve.

As best seen in FIGURE 4, the finger 34 engages a reciprocating pin 40 which extends through a wall 41 of the housing 10. The wall 41 divides the cavity 32 from a cavity 42.

A diaphragm 43, which has a bead formed around the outer periphery thereof, is secured in position in a groove 44. The center portion of the diaphragm 43 is secured to one end of the pin 40. A stiffener plate may be provided at the center portion of the diaphragm to provide a rigid surface for the engagement of a spring 46 which biases the diaphragm, as well as the pin 40 in an upward direction, as seen on the drawing. The aperture formed through the wall 41 for guiding the pin 40 may include one or more grooves to provide an air passage between the lower half 42a of the chamber 42. Therefore, the lower half 42a of the chamber 42 is vented to atmosphere. The upper half 42b of the chamber 42 includes a cap 48 which, in turn, has formed thereon the hose connector 28. The cap 48 preferably sits in a recessed portion and engages the outer periphery of the diaphragm 43 to maintain the diaphragm in a secured position.

With a pneumatic actuator as shown on the drawing, a positive pressure is applied to the upper half 42b thereby urging the diaphragm and the pin 40 downward to rotate the lever 33 which, in turn, rotates the shaft 21 and the plate 20. As mentioned hereinabove, by utilizing a pneumatic actuator of slightly different configurations, one in which the spring 46 is positioned within the upper half 42b of the chamber 42, the pneumatic actuator could be connected to a source of vacuum or negative pressure.

The portion of the pneumatic operated mixing valve shown in FIGURES 1, 3 and 4 illustrates the typical construction of the other half of the valve. The outlet port formed in a second chamber would also communicate with the outlet passage 13. This would cause the fluids issuing from the outlet port to be mixed in the valve prior to leaving the valve housing.

Seen in FIGURE 5 is an alternate arrangement of a rotatable disc which can be used in the construction of a pneumatically operated mixing valve which utilizes the principles of this invention. A rotatable disc 50 is secured to the rotatable shaft 51 and extends radially therefrom to overlie a plurality of ports 51, 52 and 53. For example, the port 51 may be an outlet port, while the ports 52 and 53 are inlet ports. Again by way of example, the inlet port 52 may be connected to a supply of cold water and the inlet port 53 may be connected to a supply of hot water. A plurality of apertures 54, 55, and 56 are formed in the plate 50 and in radial alignment with the ports 51–53. A four position pneumatic actuator may be utilized to rotate the shaft 51 to control the flow of fluid through the ports. For example, the first position of the actuator would be the full off position, as shown in FIGURE 5. The second position would rotate the plate 50 so as to place the apertures 54 and 55 in registry with the ports 51 and 52 respectively. This would cause cold water to flow from the inlet port 52 into the chamber and therefrom to the outlet port 51. A third position would cause further rotation of the plate 50 to place the aperture 56 in registry with the port 53 while still maintaining the apertures 54 and 55 in registry with the ports 51 and 52. This action would cause both hot and cold water to enter the chamber and be mixed therein and delivered to the outlet port 51. The fourth position would further rotate the plate 50 so as to maintain the apertures 54 and 56 in registry with the ports 51 and 53 respectively and place the aperture 55 out of registry with the port 52 thereby cutting off the cold water supply and allowing only hot water to pass through the valve.

I claim as my invention:

1. A fluid-operated valve comprising:

a housing including a fluid inlet port and a fluid outlet port formed therein, one of said ports including a valve seat;

means forming a first cavity, a second cavity and a first passageway connecting said first and second cavities for fluid communication;

a fluid-operated actuator mounted in said first cavity including pressure input means for receiving fluid-operated pressure, diaphragm means dividing said first cavity into first and second chambers, said first chamber in communication with said pressure input means and said second chamber in communication with said second cavity via said first passageway, and a first shaft connected to said diaphragm means and extending through said first passageway for reciprocating motion;

means forming a third chamber in said housing in communication with said inlet and outlet ports;

a second passageway extending between said second cavity and said third chamber;

a second shaft rotatably mounted in said second passageway;

means coupling said first and second shafts for translating reciprocating motion of said first shaft into rotary motion of said second shaft;

an apertured plate disposed in said third chamber to close said one port and secured to and radially extending from said second shaft, said plate being rotatable with said second shaft to place the aperture thereof in and out of registration with said valve seat; and sealing means for preventing fluid communication by way of said second passageway between said second cavity and said third chamber and between said third chamber and said one port, said sealing means comprising means forming an annular groove in said second passageway, an O-ring disposed about said second shaft and within said groove, a retaining ring disposed about said second shaft and against said O-ring, and spring means disposed between said retaining ring and said coupling means for urging said retaining ring against said O-ring and urging said apertured plate against said valve seat.

2. The valve according to claim 1, wherein said housing further includes a plurality of inlet ports and said apertured plate includes a plurality of apertures arranged in a predetermined pattern such that certain ones of said apertures are placed in registry with corresponding ones of said inlet ports in accordance with the pressure received at said pressure input means.

3. The valve according to claim 1, wherein said actuator further includes spring means disposed in said second chamber to normally urge said diaphragm means to retract said first shaft outwardly of said second cavity.

References Cited

UNITED STATES PATENTS

| | | | |
|---|---|---|---|
| 661,200 | 11/1900 | Wehinger | 137—625.41 X |
| 1,763,942 | 6/1930 | Baker | 137—606 X |
| 2,262,224 | 11/1941 | Daniels | 137—625.46 X |
| 2,919,590 | 1/1960 | Griswold | 251—58 X |
| 2,973,181 | 2/1961 | Johnson | 251—317 X |
| 3,109,457 | 11/1963 | Oliveau | 137—625.45 X |
| 2,091,110 | 8/1937 | Smallen | 137—625.41 X |
| 2,638,330 | 5/1953 | Morgenroth | 137—625.41 X |
| 2,663,459 | 12/1953 | Lagrange et al. | 251—58 X |
| 3,089,505 | 5/1963 | Forester | 137—625.46 X |

M. CARY NELSON, Primary Examiner

MICHAEL O. STURM, Assistant Examiner

U.S. Cl. X.R.

251—58, 177